(12) United States Patent
Krake et al.

(10) Patent No.: US 11,812,877 B2
(45) Date of Patent: Nov. 14, 2023

(54) HANGING DEVICE WITH RESILIENTLY DEFORMABLE SECTION

(71) Applicant: UNDER THE ROOF DECORATING INC., Calgary (CA)

(72) Inventors: Kelly R. Krake, Calgary (CA); Liette Tousignant, Calgary (CA); Michael Kurtz, Calgary (CA); Ian Matthew Campana, Calgary (CA)

(73) Assignee: UNDER THE ROOF DECORATING INC., Calgary (CA)

( * ) Notice: Subject to any disclaimer, the term of this patent is extended or adjusted under 35 U.S.C. 154(b) by 446 days.

(21) Appl. No.: 17/045,191

(22) PCT Filed: Apr. 4, 2019

(86) PCT No.: PCT/CA2019/050411
§ 371 (c)(1),
(2) Date: Oct. 5, 2020

(87) PCT Pub. No.: WO2019/191844
PCT Pub. Date: Oct. 10, 2019

(65) Prior Publication Data
US 2021/0145197 A1 May 20, 2021

Related U.S. Application Data

(60) Provisional application No. 62/653,726, filed on Apr. 6, 2018.

(51) Int. Cl.
*A47G 25/06* (2006.01)
*A47G 1/20* (2006.01)
*F16B 45/00* (2006.01)

(52) U.S. Cl.
CPC ........... *A47G 25/0628* (2013.01); *A47G 1/20* (2013.01); *F16B 45/00* (2013.01)

(58) Field of Classification Search
CPC .. A47G 25/0628; A47G 1/20; A47G 25/0607; F16M 13/02; F16M 13/022; A01G 9/128; F16B 45/00
(Continued)

(56) References Cited

U.S. PATENT DOCUMENTS 1,035,740 A 8/1912 Raes
1,439,302 A * 12/1922 Erickson ................ A47G 25/08
248/217.1
(Continued)

FOREIGN PATENT DOCUMENTS

AU 2004101030 A4 12/2004
AU 2013101357 B4 10/2013
(Continued)

OTHER PUBLICATIONS

Brick Clip, Lee Valley, from the Internet http://www.leevalley.com/us/gifts/page.aspx?p=10437&cat=53209&ap=4 (Dec. 20, 2018).
(Continued)

*Primary Examiner* — Taylor Morris
(74) *Attorney, Agent, or Firm* — Alexandre Daoust; Norton Rose Fulbright Canada LLP

(57) ABSTRACT

There is disclosed a hanging device for being secured to a brick. The device has an elongated member extending between a first end and a second end. The elongated member has a resiliently deformable section. The elongated member and the resiliently deformable section form a monolithic structure. A retaining structure is disposed on the elongated member between the first and second ends. Gripping members are each located at a respective one of the first and second ends of the elongated member and extend from the elongated member. The gripping members define abutting surfaces configured for contacting opposed sides of the brick. The abutting surfaces face each other and define a (Continued)

brick receiving space therebetween. A height of the brick receiving space is variable upon deformation of the resiliently deformable section. A method of supporting an object is also disclosed.

20 Claims, 3 Drawing Sheets

(58) Field of Classification Search
USPC .................................................. 248/217.2
See application file for complete search history.

(56) References Cited

U.S. PATENT DOCUMENTS

| | | | |
|---|---|---|---|
| 1,439,309 A | | 12/1922 | Erickson |
| 1,745,814 A | | 2/1930 | Sadler |
| 3,022,032 A | * | 2/1962 | Walls .................... A47B 91/00 248/231.21 |
| 3,642,147 A | * | 2/1972 | Voorhies ................ F16B 45/00 118/500 |
| 3,768,767 A | | 10/1973 | Dobkowski |
| 4,145,840 A | * | 3/1979 | Davidson ............... A01G 9/128 248/222.12 |
| 4,201,013 A | | 5/1980 | Robbins |
| 4,314,429 A | | 2/1982 | Casteel et al. |
| 4,337,915 A | | 7/1982 | Cali |
| 4,771,974 A | | 9/1988 | Carlson |
| 4,872,629 A | | 10/1989 | Cothran |
| D312,038 S | | 11/1990 | Sachs |
| 5,022,623 A | | 6/1991 | Laarman |
| 5,267,719 A | | 12/1993 | Keller |
| D373,948 S | | 9/1996 | Etzel et al. |
| 5,560,574 A | | 10/1996 | Vanderploeg |
| 5,577,699 A | * | 11/1996 | Gardner .................... A47F 5/08 248/302 |
| 6,273,380 B1 | | 8/2001 | Fillipp et al. |
| 6,375,137 B1 | | 4/2002 | McQuade et al. |
| 6,497,396 B1 | | 12/2002 | Adams |
| 6,794,165 B2 | | 6/2004 | Immerman |
| 6,932,310 B1 | | 8/2005 | Diss |
| 7,152,837 B1 | * | 12/2006 | Babjak .................... F16B 45/00 24/550 |
| 7,175,143 B1 | | 2/2007 | Ho et al. |
| 7,287,354 B2 | | 10/2007 | Rivers et al. |
| 7,357,364 B2 | | 4/2008 | Jackson et al. |
| 7,823,853 B2 | | 11/2010 | Larson et al. |
| 8,166,921 B2 | | 5/2012 | Biggs |
| D762,456 S | | 8/2016 | Lo et al. |
| D889,251 S | * | 7/2020 | Krake .................... A47B 91/00 D8/367 |
| 2003/0135963 A1 | * | 7/2003 | Holbrook ............ G11B 33/0411 |
| 2003/0189144 A1 | | 10/2003 | Byrne |
| 2008/0035825 A1 | * | 2/2008 | Torrey .................... A47G 1/20 248/497 |
| 2010/0155557 A1 | | 6/2010 | Carty |
| 2016/0369945 A1 | * | 12/2016 | Alcini .................... F16B 45/00 |
| 2017/0314732 A1 | * | 11/2017 | Minn ........................ F16B 2/22 |
| 2019/0309898 A1 | * | 10/2019 | Krake .................... F16B 5/121 |
| 2020/0187677 A1 | * | 6/2020 | Thrush .................. E04F 13/072 |
| 2022/0022668 A1 | * | 1/2022 | Khodaparast .............. C09J 7/22 |

FOREIGN PATENT DOCUMENTS

| | | | | |
|---|---|---|---|---|
| CN | 108253053 A | * | 7/2018 | .......... A47B 96/061 |
| WO | WO-9825449 A1 | * | 6/1998 | .......... A47B 96/061 |

OTHER PUBLICATIONS

Big Green Leaf Brick Utility Hook 3 95, from the Internet https://www.pinterest.ca/pin/8373949281112597/ (Sara Clark Partyka's Page).
Brick Hangers—Set of 4, from the Internet https://www.improvementscatalog.com/brick-hangers-set-of-4/10098 (Dec. 20, 2018).
Brick Hook Hanger Bric Crab, from the Internet https://ozdingo.com.au/products/brick-hook-hanger (Dec. 20, 2018).
Hillman Brick/Block Hangers, from the Internet https://www.lowes.ca/picture-hangers/the-hillman-group-brickblock-hangers_g1496778.html (Dec. 20, 2018).
Gifts 1.75" Key Hole Hook W/Screws 2Pk, Silver, from the Internet https://www.amazon.com/1st-Choice-Screws-1-75-Inch-2-Pack/dp/B0051ZSIDK (May 21, 2011).

* cited by examiner

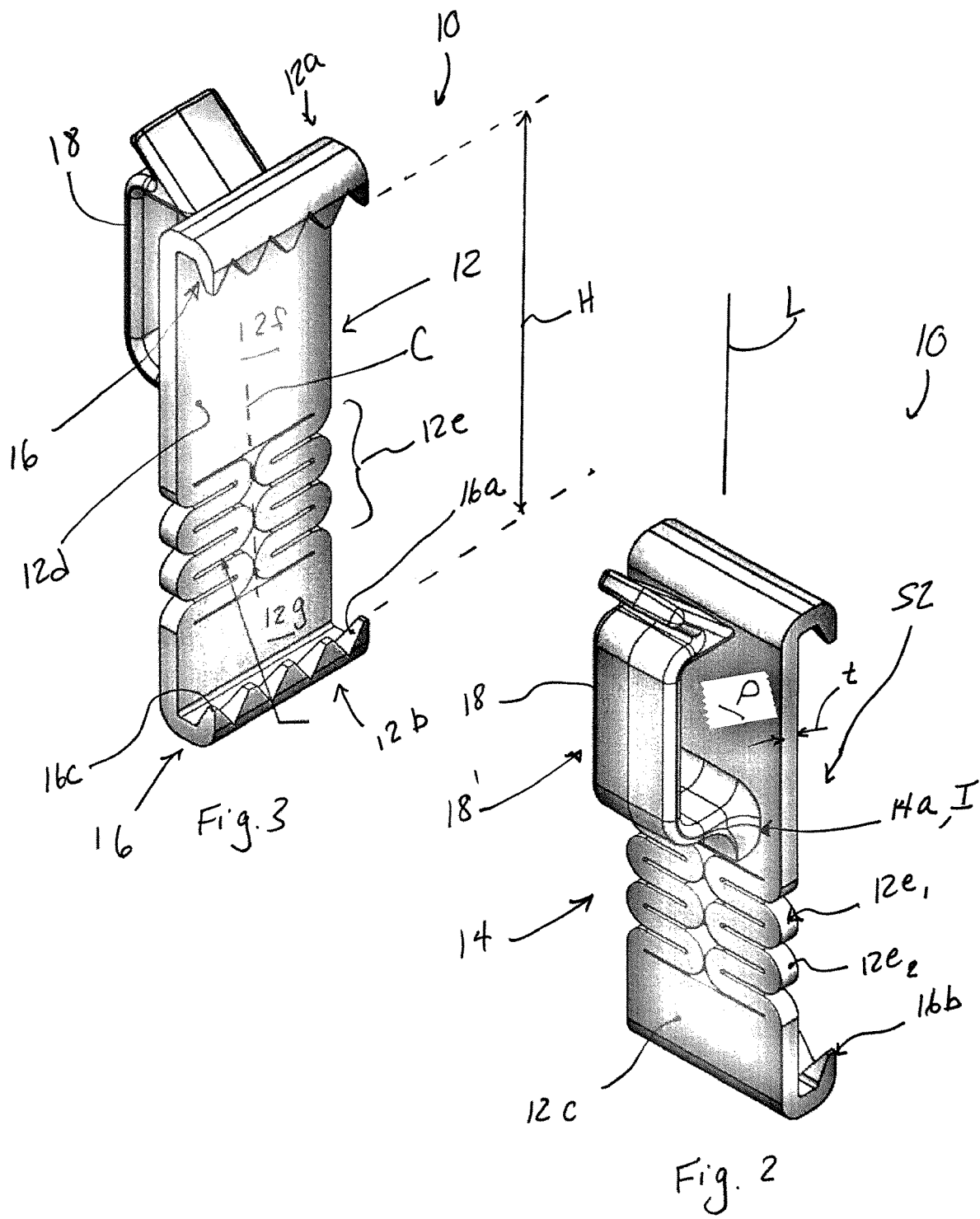

HANGING DEVICE WITH RESILIENTLY DEFORMABLE SECTION

FIELD

The application relates generally to hanging devices and, more particularly, to hanging devices configured to be supported by a brick of a brick wall.

BACKGROUND

Hanging an object to a brick wall is often cumbersome. Brick walls are quite hard and, therefore, special equipment might be required to drill holes therethrough. Moreover, it is not desired to have holes in brick walls because such holes may fill up with water that might freeze during winter and that might cause the bricks of the brick wall to crack. Existing hanging devices are either typically designed for a specific brick size and cannot be attached to other bricks having different dimensions or are not easy to use.

SUMMARY

In one aspect, there is provided a hanging device for being secured to a brick, comprising: an elongated member extending between a first end and a second end, the elongated member having a resiliently deformable section between the first and second ends, the elongated member and the resiliently deformable section forming a monolithic structure; a retaining structure disposed on the elongated member between the first and second ends; and gripping members each located at a respective one of the first and second ends of the elongated member and extending from the elongated member, the gripping members defining abutting surfaces to contact opposed sides of the brick, the abutting surfaces of the gripping members facing each other and defining a brick receiving space therebetween, a height of the brick receiving space being variable upon deformation of the resiliently deformable section.

In another aspect, there is provided a method of supporting an object from a brick, the method comprising: positioning one of two gripping members on one of opposed sides of the brick, the two gripping members located at respective ends of an elongated member; stretching a resiliently deformable section of the elongated member; positioning the other of the two gripping members on the other of the opposed sides of the brick; and supporting the object from a retaining structure disposed on the elongated member.

Many further features and combinations thereof concerning the present improvements will appear to those skilled in the art following a reading of the instant disclosure.

DESCRIPTION OF THE FIGURES

In the figures,

FIG. 2 is a schematic front elevation oblique view of the hanging device of FIG. 1;

FIG. 3 is a schematic rear elevation oblique view of the hanging device of FIG. 1.

DETAILED DESCRIPTION

Figure 1:
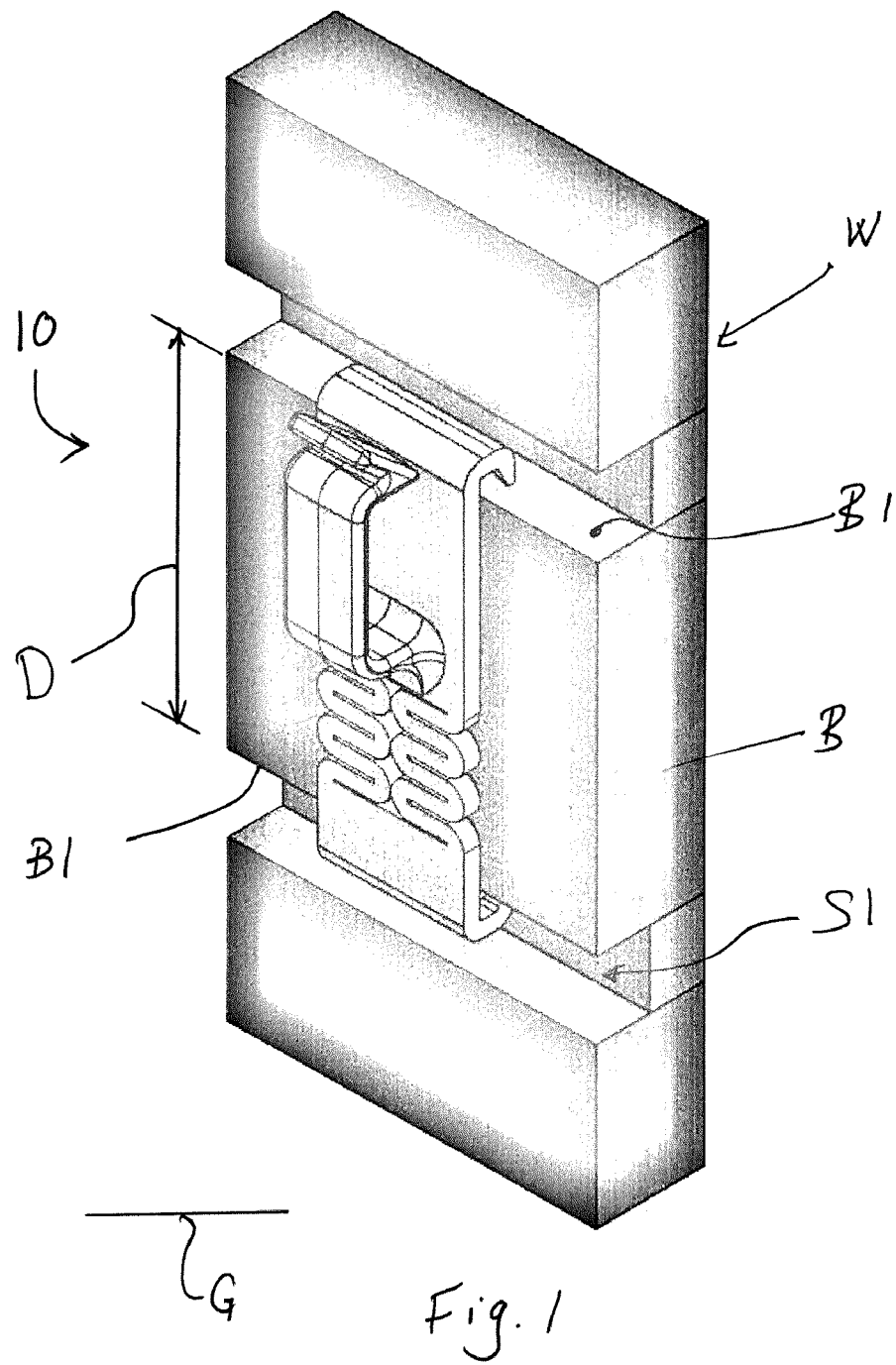
FIG. 1 is a schematic oblique view of a hanging device secured to a brick of a brick wall in accordance with one embodiment.

Referring to FIGS. 1-3, a hanging device for being secured to a brick B of a brick wall W is generally shown at 10. The device 10 includes an elongated member 12 that extends between a first end 12a and a second end 12b and that defines an outer surface 12c and an opposed inner surface 12d. As shown, the inner surface 12d is configured to be oriented toward the brick B when the hanging device 10 is secured to the brick B as shown in FIG. 1. The first and second ends 12a, 12b are spaced apart from each other along a longitudinal axis L of the elongated member 12.

The elongated member 12 includes a resiliently deformable section 12e between the first and second ends 12a, 12b. In the depicted embodiment, the elongated member 12 includes two sections 12f, 12g. The resiliently deformable section 12e is located between the two sections 12f, 12g relative to the longitudinal axis L, and interconnects the two sections 12f, 12g. Herein, resiliently deformable means that the resiliently deformable section 12e is able to be deformed upon a force applied in a direction parallel to the longitudinal axis L and that the section 12e tends to revert back to its original shape upon release of the force.

In the embodiment shown, the elongated member 12 and the resiliently deformable section 12e form a monolithic structure 14. Stated otherwise, the elongated member 12 and the resiliently deformable section 12e are integral. In the embodiment shown, the monolithic structure 14 is made of any suitable thermoplastic material, such as polycarbonate or any other suitable material. The monolithic structure 14 may be manufactured by any suitable process, such as, by moulding. The monolithic structure 14 may be formed of an injectable material such as a thermoplastic that may be polycarbonate.

The resiliently deformable section 12e includes at least one planar spring $12e_1$. In the embodiment shown, two planar spring are disposed side-by-side. In the embodiment shown, the planar springs $12e_1$, and the two sections 12f, 12g of the elongated members all extend from the elongated outer side 12c to the elongated inner side 12d. Stated otherwise, the planar springs $12e_1$ are coplanar with the elongated member sections 12f, 12g. In other words, the planar springs $12e_1$ and the elongated member sections 12f, 12g lie within a common plane P. The resiliently deformable section 12e is deformable in the common plane P. The planar springs $12e_1$ define part of the inner and outer surfaces 12d, 12c of the elongated member 12 and are part of the monolithic structure 14. As shown, a thickness t of the elongated member 12 corresponds to that of the planar springs $12e_1$ and the elongated member sections 12f, 12g.

As illustrated, one of the springs $12e_1$ is the mirror image of the other relative to a center axis C of the elongated member 12. In the embodiment shown, each of the springs $12e_1$ has a sinusoidal shape defined by a plurality of adjacent and interconnected "U"-shaped sections $12e_2$. As illustrated, each of the springs $12e_1$ has three "U"-shaped sections $12e_2$. The resiliency of the resiliently deformable section 12e is provided by the material of the springs $12e_1$. Other configurations are contemplated.

Referring more particularly to FIG. 3, the hanging device 10 includes gripping members 16 each located at a respective one of the first and second ends 12a, 12b of the elongated member 12. The gripping members 16 extend from the elongated member 12. More specifically, the gripping members 16 extend from the elongated member inner surface 12d. The gripping members 16 define abutting surfaces 16a that are in contact with opposed sides B1 of the brick B as shown in FIG. 1. The gripping members 16 are configured to be received between spaces S1 defined between two adjacent bricks B of the brick wall W.

The abutting surfaces 16a of the gripping members 16 face each other and define a brick receiving space S2 therebetween. A height H of the brick receiving space S2 is variable upon deformation of the resiliently deformable section 12e. At rest and in an uninstalled configuration, the height H of the brick receiving space S2 is less than a distance D between the opposed sides B1 of the brick B such that, when the hanging device 10 is secured to the brick B, the resiliently deformable section 12e exerts a biasing force for clamping the brick B between the two gripping members 16.

In the embodiment shown, the gripping members 16 each have a curved portion and may extend perpendicularly from the elongated member 12. As shown, the gripping members 16 have teeth 16b that define the abutting surface 16a. The teeth may have a pyramidal shape having a tip 16c that may be flat. In the embodiment shown, the abutting surface 16a is defined by the teeth tips 16c. It is understood that the teeth 16b may have other shapes, such as, conical and frusto-conical.

The device 10 further has a retaining structure 18' located between the first and second ends 12a, 12b of the elongated member 12. In the embodiment shown, the retaining structure 18' protrudes outwardly from the outer surface 12c of the elongated member 12. As discussed herein below, the retaining structure 18' may be embodied as a hook 18 that might take a plurality of different shapes as a function of the intended use. In the embodiment shown, the retaining structure 18' is part of the monolithic structure 14. It is however understood that the retaining structure 18' may be an aperture defined through the elongated member 12. Such aperture may be configured for removably receiving a hook.

In the illustrated embodiment, the monolithic structure 14 has reinforcement fillets 14a located at an intersection I between the hook 18 and the elongated member 12. Such fillets 14a might help alleviate stress concentrations that might occur at this intersection I. In a particular embodiment, a chamfer is used.

In the installed configuration depicted in FIG. 1, one of the two elongated member sections 12f, 12g is located above the other when the elongated member 12 is mounted on the brick B. In the embodiment shown, the retaining structure 18' is located at an upper one 12f of the two sections 12f, 12g that is located above a lower one 12g of the two sections 12f, 12g. Therefore, in a particular embodiment, a weight of an object hanged to the brick B via the hanging device 10 will not cause the resiliently deformable section 12e to deform by providing the retaining structure on the upper one 12f of the two sections 12f, 12g. It is understood that although FIG. 1 illustrates the hanging device 10 disposed vertically, the hanging device 10 may be disposed horizontally.

In a particular embodiment, the disclosed hanging device 10 may cater to different sizes of brick B via deformation of the resiliently deformable section 12 of the elongated member 12. The abutting surfaces 16a of the hanging device gripping members 16 may be able to contact the brick B along an entire length of the gripping members 16 even for uneven bricks.

Still referring to FIGS. 1-3, for supporting an object from the brick B, one of two gripping members 16 is positioned on one of the opposed sides B1 of the brick B. The resiliently deformable section 12e of the elongated member 12 is stretched along the longitudinal axis L. The other of the two gripping members 16 is positioned on the other of the opposed sides B1 of the brick B. The object is supported from the retaining structure 18' disposed on the elongated member 12.

In the depicted embodiment, a lower one of the two gripping members 16 is positioned on a lower one of the opposed sides B1 of the brick B before the resiliently deformable section 12e is stretched. In the embodiment shown, stretching the resiliently deformable section 12e includes stretching at least one planar spring $12e_1$. In the embodiment shown, disposing the lower one of the two gripping members 16 before the upper one allows using the retaining structure 18' so stretch the resiliently deformable section 12e. Alternately, the upper one of the gripping members 16 may be positioned on an upper one of the brick opposed sides B1 before the resiliently deformable section 12e is stretched.

FIGS. 4a to 4h show different configurations for the retaining structure 18' described above, it being appreciated that retaining structure 18' may have even more configurations, and is not limited to the configurations disclosed herein. It will therefore be appreciated that the retaining structure 18' of the hanging device 10 may be shaped in a number of different ways for different purposes.

Figure 4A:
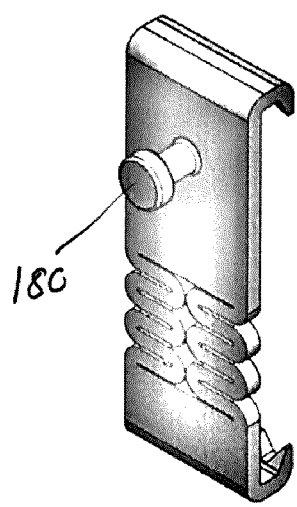
FIGS. 4a to 4h are schematic oblique views of a hanging device similar to that shown in FIG. 1, with different embodiments of a retaining structure of the hanging device.
Figure 4B:
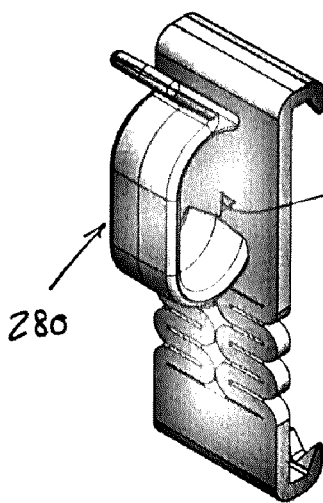
Figure 4C:
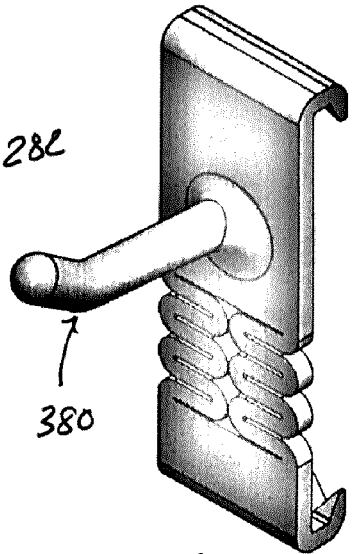
Figure 4D:
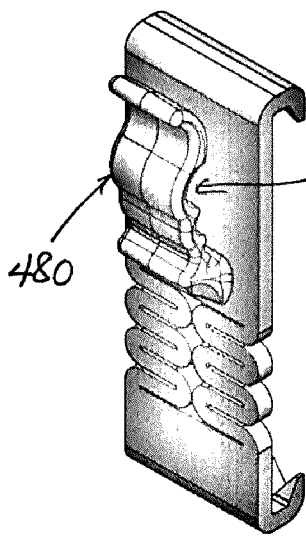
Figure 4E:
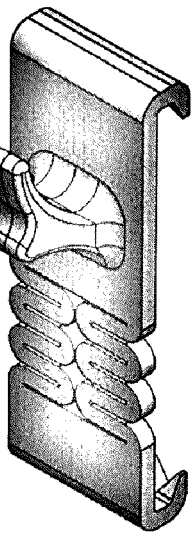
Figure 4F:
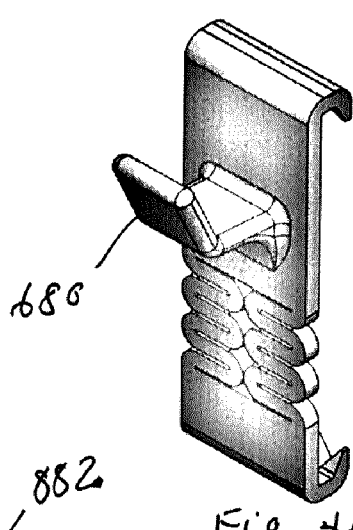
Figure 4G:
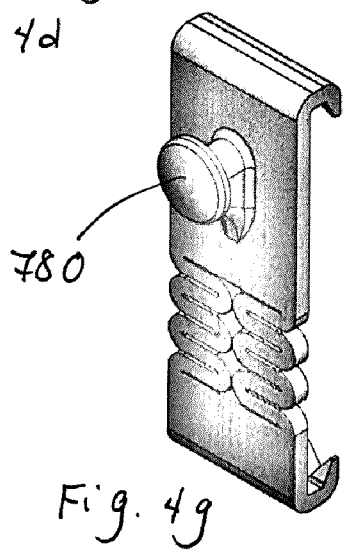

In FIGS. 4a and 4g, the retaining structure 18' is a button 180, 780 which projects outwardly from the outer surface 12c of the elongated member 12. The button configuration of the retaining structure 18' allows the object to be mounted to the button retaining structure 18' via a recess in the object 16 to be mated to the retaining structure 18'.

In FIG. 4b, the retaining structure 18' is a locking hook 280 defining a cavity 282 for receiving a portion of the object suspended thereon. The locking hook 280 has a portion oriented toward the elongated member 12 that might preclude the object for falling off the hanging device.

In FIG. 4c, the retaining structure 18' is a tool peg 380, which protrudes outwardly from the elongated member 12. The tool peg configuration of the retaining structure 18' supports the object by suspending it, or by inserting the tool peg 380 into the object.

In FIG. 4d, the retaining structure 18' is a snapping wire clip 480 for various diameter cables, which projects outwardly from the elongated member 12. The wire clip configuration of the retaining structure 18' allows the object 16 to be secured within a cavity 482 defined by the wire clip between the retaining structure 18' and the outer surface 12c of the elongated member 12.

In FIG. 4e, the retaining structure 18' is a tapered hook 580 which projects outwardly from the elongated member 12. The tapered hook configuration of the retaining structure 18' allows the object to be suspended therefrom.

In FIG. 4f, the retaining structure 18' is a rectangular hook 680 which projects outwardly from the elongated member 12. The rectangular hook configuration of the retaining structure 18' allows the object to be suspended therefrom.

Figure 4H:
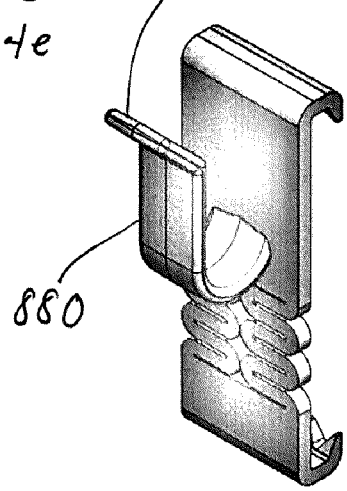

In FIG. 4h, the retaining structure 18' is an elongated curved hook 880 having a rectangular section 882 that might help guide the object in engagement with the hanging device.

As can be understood, the examples described above and illustrated are intended to be exemplary only. The scope is indicated by the appended claims.

What is claimed is:

1. A hanging device for being secured to a brick, comprising:
    an elongated member extending between a first end and a second end, the elongated member having a resiliently deformable section between the first and second ends, the elongated member and the resiliently deformable section forming a monolithic structure, the resiliently deformable section including two planar springs disposed side by side, the two planar springs lying in a common plane with the elogated member and being deformable in the common plane, one of the two planar springs being a mirror of the other planar spring relative to a central axis of the elongated member, each of the two planar springs defined by a plurality of adjacent and laterally alternating "U"-shaped sections extending between the first and second ends;

a retaining structure disposed on the elongated member between the first and second ends; and gripping members each located at a respective one of the first and second ends of the elongated member and extending from the elongated member, the gripping members defining abutting surfaces to contact opposed sides of the brick, the abutting surfaces of the gripping members facing each other and defining a brick receiving space therebetween, a height of the brick receiving space being variable upon deformation of the resiliently deformable section.

2. The hanging device of claim 1, wherein the resiliently deformable section is deformable along a longitudinal axis of the elongated member, the longitudinal axis extending between the first and second ends.

3. The hanging device of claim 1, wherein the retaining structure is part of the monolithic structure.

4. The hanging device of claim 1, wherein the elongated member has an inner side and an opposed outer side, the two planar spring defining part of both the inner and outer sides.

5. The hanging device of claim 1, wherein the gripping members have teeth defining the abutting surfaces.

6. The hanging device of claim 5, wherein each of the teeth have a pyramidal shape.

7. The hanging device of claim 6, wherein the abutting surfaces are defined by tips of the teeth, the tips of the teeth being flat.

8. The hanging device of claim 1, wherein the monolithic structure is made of an injectable material.

9. The hanging device of claim 1, wherein the elongated member has a first section and a second section, the resiliently deformable section extending between and interconnecting the first and second sections, the retaining structure being disposed on one of the first and second sections.

10. The hanging device of claim 9, wherein the one of the first and second sections is an upper one of the first and second sections upon the hanging device being disposed vertically on the brick.

11. The hanging device of claim 9, wherein the first, second, and resiliently deformable sections lie in the common plane.

12. The hanging device of claim 1, wherein the retaining structure is a hook.

13. The hanging device of claim 12, wherein the hook is part of the monolithic structure.

14. The hanging device of claim 13, wherein the monolithic structure includes one of reinforcement fillets and chamfers at an intersection between the hook and the elongated member.

15. The hanging device of claim 1, wherein the retaining structure projects from an outer surface of the elongated member, and the gripping members extend from an inner surface of the elongated member.

16. A method of supporting an object from a brick, the method comprising:

positioning one of two gripping members on one of opposed sides of the brick, the two gripping members located at respective ends of an elongated member;

stretching a resiliently deformable section of the elongated member, the resiliently deformable section including two planar springs disposed side by side, the two planar springs lying in a common plane with the elogated member and being deformable in the common plane, one of the two planar springs being a mirror of the other planar spring relative to a central axis of the elongated member, each of the two planar springs defined by a plurality of adjacent and laterally alternating "U"-shaped sections extending between the first and second ends;

positioning the other of the two gripping members on the other of the opposed sides of the brick; and supporting the object from a retaining structure disposed on the elongated member.

17. The method of claim 16, wherein stretching the resiliently deformable section includes stretching the two planar springs.

18. The method of claim 16, wherein positioning the one of the two gripping members on the one of the opposed sides of the brick is performed before stretching the resiliently deformable section.

19. The method of claim 16, wherein, prior to stretching, a height of a brick receiving space defined between abutting surfaces of the two gripping members is less than a distance between the opposed sides of the brick.

20. The method of claim 16, wherein the one of the two gripping members is a lower one of the two gripping members.

\* \* \* \* \*